(12) United States Patent
Nguyen (10) Patent No.: US 7,761,622 B2
(45) Date of Patent: Jul. 20, 2010

(54) CENTRALIZED SERVER RACK MANAGEMENT USING USB

(75) Inventor: Vincent Nguyen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 11/828,724

(22) Filed: Jul. 26, 2007

(65) Prior Publication Data

US 2009/0031051 A1 Jan. 29, 2009

(51) Int. Cl.
- G06F 13/12 (2006.01)
- G06F 13/38 (2006.01)
- G06F 15/173 (2006.01)

(52) U.S. Cl. .................... 710/62; 709/219; 709/223

(58) Field of Classification Search .................. None
See application file for complete search history.

(56) References Cited

U.S. PATENT DOCUMENTS

| | | | |
|---|---|---|---|
| 6,366,951 B1 * | 4/2002 | Schmidt | 709/208 |
| 6,963,936 B2 * | 11/2005 | Billington et al. | 710/62 |
| 7,003,563 B2 | 2/2006 | Leigh et al. | |
| 2003/0005196 A1 | 1/2003 | Reed | |
| 2006/0095595 A1 * | 5/2006 | Dalton et al. | 710/5 |
| 2006/0116023 A1 * | 6/2006 | Spitaels et al. | 439/532 |
| 2006/0161960 A1 * | 7/2006 | Benoit | 725/105 |
| 2006/0190238 A1 * | 8/2006 | Autor et al. | 703/25 |
| 2006/0236155 A1 * | 10/2006 | Lee et al. | 714/31 |
| 2007/0101029 A1 * | 5/2007 | Lee | 710/72 |

OTHER PUBLICATIONS

USB hub, Nov. 13, 2006, Electronics Information Online, http://www.electronics-manufacturers.com/info/networking-equipment/usb-hub.html.
International Search Report and the Written Opinion, dated Feb. 25, 2009, 11 pages.

* cited by examiner

Primary Examiner—Henry W. H. Tsai
Assistant Examiner—Michael Sun (57) ABSTRACT

A multi-server computing system includes a plurality of server modules mounted in an enclosure; each server has a universal serial bus (USB) interface. An enclosure onboard administration (OA) module is also mounted in the enclosure and has an addressable communication interface for connection to a remote management system and a USB interface connected to each of the plurality of servers. The USB interface of the enclosure OA operates as a master and the USB interface of each of the plurality of servers acts as a slave to the enclosure OA, such that each of the server modules can be managed by the remote management system using a single communication address.

19 Claims, 6 Drawing Sheets

CENTRALIZED SERVER RACK MANAGEMENT USING USB

FIELD OF THE INVENTION

This invention generally relates to computer systems, and more particularly to rack mount server systems.

BACKGROUND OF THE INVENTION

A server is a computer connected to a network with components similar to the typical personal computer (PC) such as a microprocessor, memory chips and disc drives. But because the server communicates with other computers, the keyboard and video display are not necessary. Also like the typical PC, the server has a power supply and needs to dissipate heat roughly equal to the total electrical power input to the device. A typical rack or cabinet is 24- to 30-in. wide, 36 to 44-in. long and 76-in. high and can incorporate up to 42 U of computing equipment. "U" is a standard unit indicating the height of the computer server. Each "U" is 1.75 in. A 5 U server is 8.75 in. tall, therefore eight 5 U servers fill a 42 U rack. Like most electronic devices, the processing power and space efficiency of the servers has increased considerably in the last several years.

Blade servers are self-contained computer servers, designed for high density. Whereas a standard rack-mount server can exist with (at least) a power cord and network cable, blade servers have many components removed for space, power and other considerations while still having all the functional components to be considered a computer. A blade enclosure provides services such as power, cooling, networking, various interconnects and management—though different blade providers have differing principles around what should and should not be included in the blade itself and sometimes in the enclosure altogether. Together these form the blade system.

The servers are aggregated and managed locally or remotely through an enclosure onboard administrator (OA). Typically, each server includes a base management controller (BMC) that is connected to the onboard administrator via an Ethernet router to provide a single centralized management appliance for rack mount servers. Each BMC has an IP address and each server is managed individually and directly via the server's BMC. Cable clutter within the rack is a problem as server density increases and is aggravated by the internet cable to each BMC.

A universal serial bus (USB) hub is a standard peripheral interface for connecting a computer to different devices, such as digital cameras, monitors, modems, mouse, printers, scanners, game controllers, keyboards, and so on. USB hubs are described in an article "USB Hub", (Electronics Information Online, 13 Nov. 2006), which is incorporated by reference herein and reproduced in part below.

The Universal Serial Bus (USB) is a peripheral bus specification that supports data exchange between a host computer and a wide range of simultaneously accessible peripherals. The bus allows peripherals to be attached, configured, used, and detached while the host and other peripherals are in operation. The capability eliminates the need to install interface card into dedicated computer slots and reconfigure the system each time a peripheral is attached or detached from a PC. Computer peripheral input/output (I/O) devices connect to a variety of data ports or external connectors of a host computer system, which includes a system processor and memory.

Peripheral device interfaces that comply with the specification are referred to as USB interfaces and have been included in many recently developed personal computer systems. Such USB devices are generally referenced as either low-speed devices, capable of transferring data at a rate of 1.5 Megabits per second (Mb/s); or high-speed devices (also called full-speed devices) capable of transferring data at 12 Mb/s. Under the USB 2.0 specification, full-speed devices are capable of using 40 times multipliers for a transfer rate of 480 Mb/s, and such USB devices are typically known as true high-speed devices. A USB standard interface allows up to 127 peripheral devices to be attached to a host, usually a personal computer (PC), through a 4-wire bus. Such devices can be connected to the PC either directly, or via hubs.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
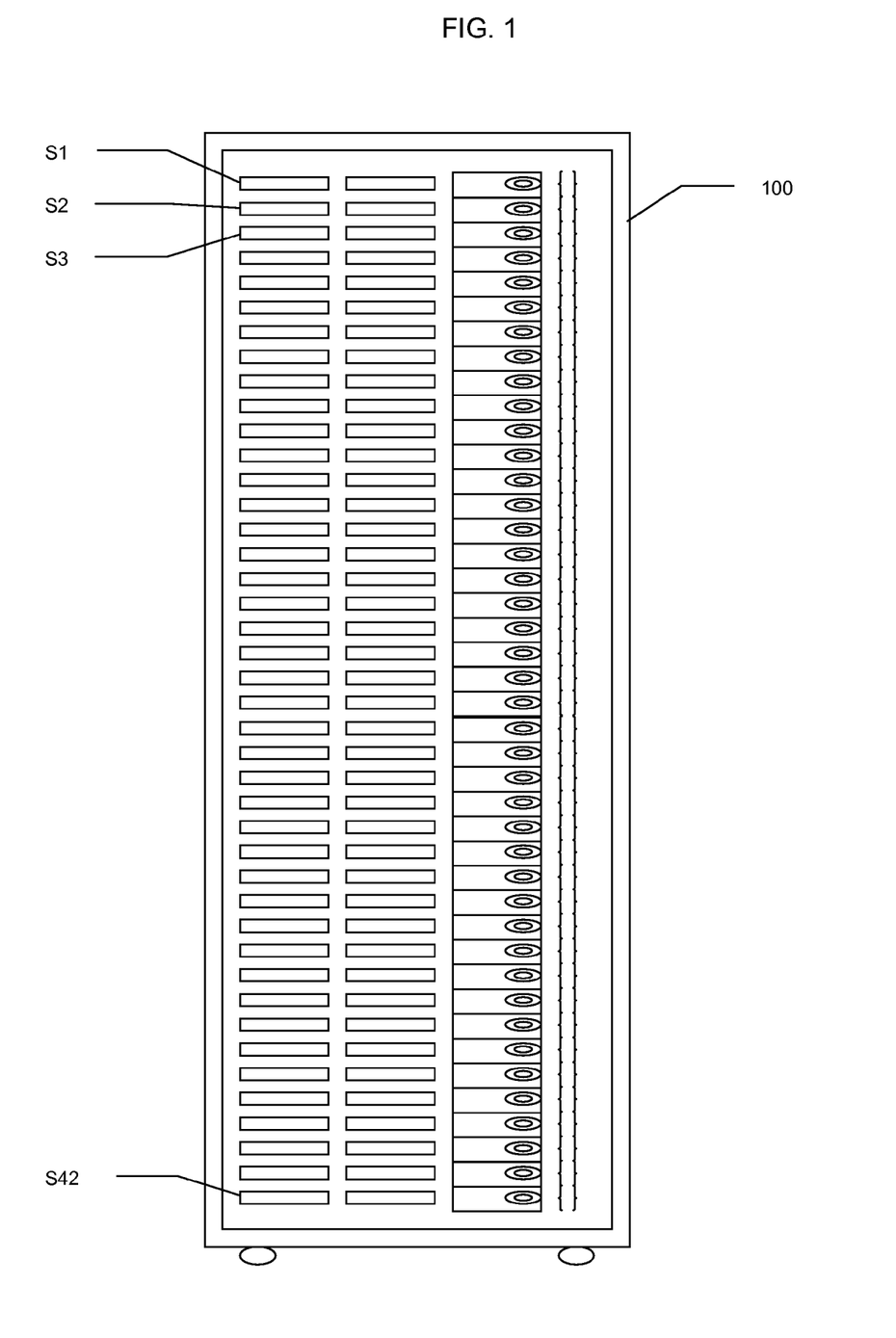
FIG. 1 illustrates a 42 U rack system containing 42 servers.

FIG. 1 illustrates a 42 U rack system 100 containing 42 servers S1-S42. Newer servers are even thinner, some being referred to as "pizza boxes" and being only 1 U. With these servers, a single rack may hold up to 42 servers. Another embodiment of a rack system using blade servers is referred to as a blade server.

In a standard server-rack configuration, 1 U (one rack unit, 19" wide and 1.75" tall) is the minimum possible size of any equipment. The principal benefit of blade computing is that components are no longer restricted to these minimum size requirements. The most common computer rack form-factor being 42 U high, this limits the number of discrete computer devices directly mounted in a rack to 42 components. Blades do not have this limitation; densities of 100 computers per rack and more are achievable with the current generation of blade systems.

An enterprise IT (information technology) administrator individually manages rackmount servers in data center or remote branch office. It has now been discovered that by using a universal serial bus (USB) interconnect to interconnect the onboard administrator and the various servers and other components within the rack system significant cost savings are realized and overall control is simplified.

Figure 2:
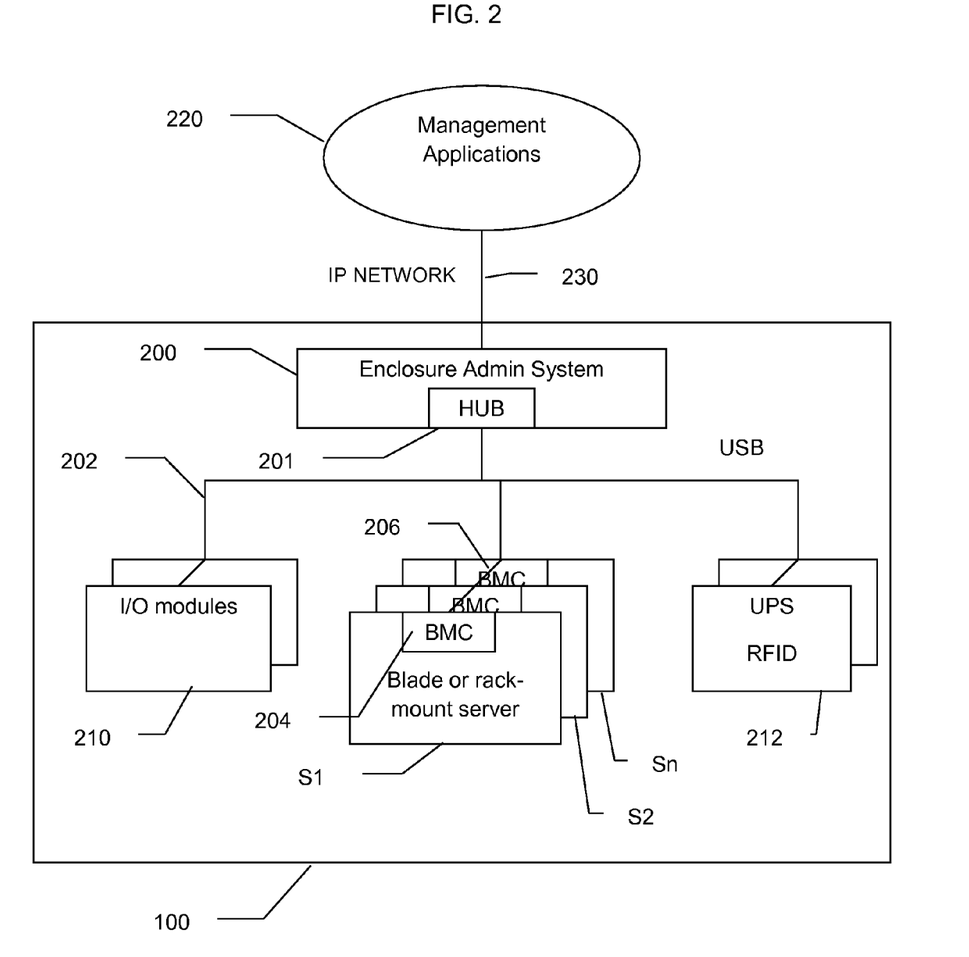
FIG. 2 is a block diagram illustrating a representative portion of the servers contained within the rack system of FIG. 1, and also illustrating an onboard administration system connected to the servers via a USB interconnect.

With 480 Mb/s, the USB2 technology has sufficient bandwidth to manage 42 rackmount servers or even more blade servers in an enclosure simultaneously. In addition, the USB management solution can seamlessly interface with power distribution units (PDU), uninterruptable power supplies (UPS), and mass storage enclosures in a rack since most appliance devices provide or can be designed to have a USB interface FIG. 2 is a block diagram illustrating a representative portion of the servers contained within rack system 100, and also illustrating an onboard administration system 200 connected to the servers via a USB interconnect 202. Rack manager or blade enclosure OA 200 consists of a USB host controller hub 201 which provides centralized and aggregated management ports that connect to BMC 204 of each server node in the rack or blade enclosure. From an IT point of view, there is a single management appliance device that an administrator can simply manage and thereby consolidate all IT activities for the entire rack or enclosure. The USB host controller in rack mount or enclosure OA is a management gateway to an individual rack-mount or blade server's BMC in which each BMC acts as a USB device to the OA's USB host controller. The USB host controller can support up to 127 devices. The USB interface between the rack OA manager and computing nodes can be a standard four-wire cable 202 or it can also be implemented as signal traces on a backplane, for example as illustrated at 206, depending on applications and objectives. Enclosure OA 200 may also be connected to various input/output (I/O) modules 210, power supplies 212, radio frequency identification (RFID) tags used to identify the rack to a technician, and various other modules within the rack that the management system needs to contact for management and/or observation.

The USB supports functional data and control exchange between a USB host application on enclosure OA 200 and each USB device as a set of either unidirectional or bi-directional pipes. USB data transfers take place between host software and a particular endpoint on a USB device. The USB system software on OA 200 manages interactions between USB devices and host-based device software. The OA host software is responsible for detecting the attachment and removal of USB devices, managing control flow between the OA and USB devices, managing data flow between the OA and USB devices, and collecting status and activity statistics. The USB architecture automatically detects a device being connected and provides a unique address to each device which may then be used to communicate with the device over the common USB connection. The host determines if the newly attached USB device is a hub or a function and assigns a unique USB address to the USB device. The host establishes a control pipe for the USB device using the assigned USB address and endpoint number zero. If the attached USB device is a hub and USB devices are attached to its ports, then the above procedure is followed for each of the attached USB devices. If the attached USB device is a function, then attachment notifications will be dispatched by the USB software to interested host software.

The USB specification totally defines the physical layer, protocol layer, transfer model, power distribution, mechanical, hub operation of a USB systems. The high speed USB2.0 specification was released Apr. 27, 2000, with various updates after that. USB is a Host centric connectivity system. The USB Host dictates the use of the USB bus. No slave devices can assert signal on the bus until the USB Host ask for it. Each slave device on the bus is assigned a unique USB address through a process of enumeration.

When a new USB device attached itself on the bus, the USB host asks for basic information from the device through a default USB address 0. Then, the host will assign a unique USB address to it. The host will ask for further information such as: the USB Class it conforms to, how many USB endpoints it has, which manufacturer it is from, what is the Vendor ID/Product ID such that the associated device driver can be loaded. The Host polls the above information through the Control pipe according to the USB Requests defined in Chapter 9 of the USB specifications.

As described above, traditionally the USB interface associated with a server, blade, processor or personal computer (PC) acted as a host and various peripheral devices were connected to it as subservient USB devices. In this embodiment, the USB interface associated with a server or blade is configured to operate as a USB device that is subservient to the host USB interface provided by OA 200.

The system administrator console may be located close to rack system 100 in a datacenter, or the datacenter may be a "lights out" facility and the administrator console is located in a remote location, such as in another building or in another city. A management application is operated on a management processing system 220 that provides the system administration console user interface. Management system 220 is connected to rack system 100 via a local or remote communication system 230. Generally, this will be an internet based system, but various wide area technologies may be used to provide this interconnect. Enclosure OA 200 will be assigned just a single internet protocol (IP) address, so that the entire rack full of servers appears to the management system as a single network device, thereby greatly simplifying system set-up and control.

In this embodiment, management system 220 is an HP System Insight Manager (SIM), available from Hewlett Packard Company. Other embodiments may use other known or later developed management systems to control rack system 100. Management system 220 enables an administrator to respond to demands for system configuration and maintenance through automated deployment and continuous management of software, including operating systems, applications, patches, content and configuration settings, on a wide breadth of devices throughout the lifecycle of the system. This provides efficiency to control management costs, agility to bring services to customers and users faster, and compliance by ensuring only authorized software is maintained on systems and policies are continually enforced, for example.

Figure 3:
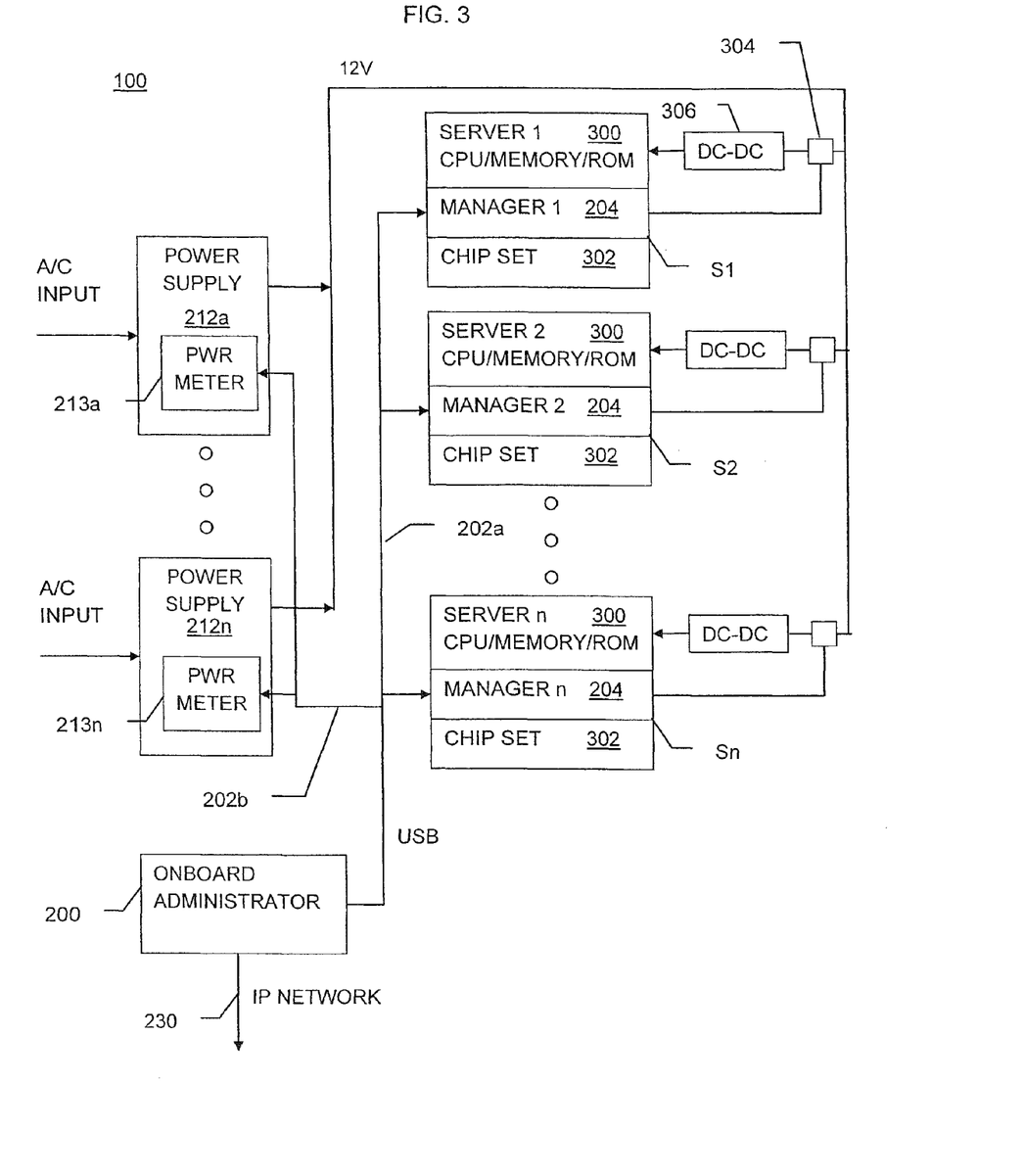
FIG. 3 is a more detailed block diagram of a representative portion of the rack system of FIG. 2 illustrating USB connections to various components of the rack system.

FIG. 3 is a more detailed block diagram of a representative portion of rack system 100 of FIG. 2 illustrating USB connections to various components of the rack system. OA 200 is connected to each of servers S1-Sn via USB interconnect 202. Interconnect 202 is embodied as a four wire cable in some portions such as 202b and as four signal traces on a backplane in portion 202a. Each server S1-Sn includes a BMC 204 that includes a local processor to execute device management software. As discussed above, the device management application responds to management commands sent from management system 220 to OA 200 and then distributed within the rack via USB interconnect 202.

Each BMC 204 is also interconnected to various modules within the respective server to provide sensing and control of hardware elements. For example, 12 v DC is distributed to each server. Respective DC to DC converters 306 convert the 12 v to whatever voltage is needed by the respective server. A current sense node 304 allows the BMC to monitor and report individual server power use back to the management system via the USB interconnect.

The main computing portion of each server S1-Sn includes CPU and memory complex 300, a support chip set 302 and non-volatile storage read only memory (ROM) that stores various firmware execution routines such as power on self test (POST) and system management mode interrupt routines (SMI). CPU and memory complex 300 is representative of a server CPU and memory system and various embodiments of server 100 may have different configurations of CPUs, main memory, cache and non-volatile memory included in representative CPU and memory complex 300. In this embodiment, processor 300 is compatible with the industry standard Intel x86 architecture, but the management techniques described herein are not limited to x86 systems. Various embodiments of the server may include one, two or more processor cores within a single chip set. Mass storage devices, networking devices and various other support circuitry are included within server 100 but are not shown in this figure.

OA 200 is connected to the system power supplies 212a-212n and to a power meter 213a-213n within each power supply via USB interconnect 202b. This allows OA 200 to observe and control power usage of the entire system 100 and to report this to management system 220.

Figure 4:
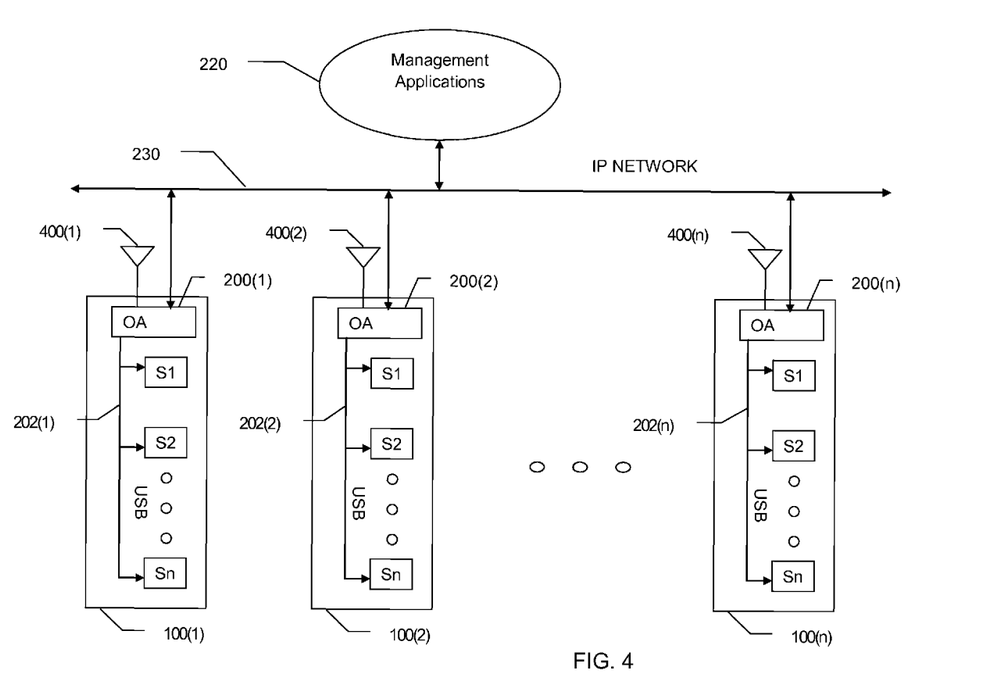
FIG. 4 is a block diagram illustrating a large installation of rack systems connected to a single management system.

FIG. 4 is a block diagram illustrating a large installation of rack systems 100(1)-100(n) connected to a single management system 220. As discussed above, IP network may be a wide area network if management system 220 is located remotely from the data center that contains rack systems 100(1)-100(n). In another embodiment, management system 220 is located within the data center that houses rack systems 100(1)-100(n) and is then a local area network. In either embodiment, each OA 200(1)-200(n) need only be assigned one IP address so that set up and configuration of the data center is simplified. Within each rack system 100(1)-100(n), all of the servers and other monitored devices are interconnected via USB 202(1)-202(n) respectively. Each maintenance command sent by management system 220 is routed to the appropriate OA 200(1)-200(n) with the IP address for that particular OA. Once a maintenance request is received at the appropriate rack system, the OA sends the request to the designated server using USB addressing.

To further simplify maintenance of the datacenter, each OA may be equipped with a wireless USB receiver 400(1)-400(n), respectively. This is commonly referred to as a "USB dongle". The wireless USB receiver allows a technician to walk up to each rack system and initiate a maintenance session with the OA of that rack using a wireless USB device, such as a personal digital assistant (PDA). Other types of wireless USB user interface devices may also be used by the technician to interact with the rack system OA. In this manner, maintenance can be performed on the rack system without the need to physically connect to the rack system.

Figure 5:
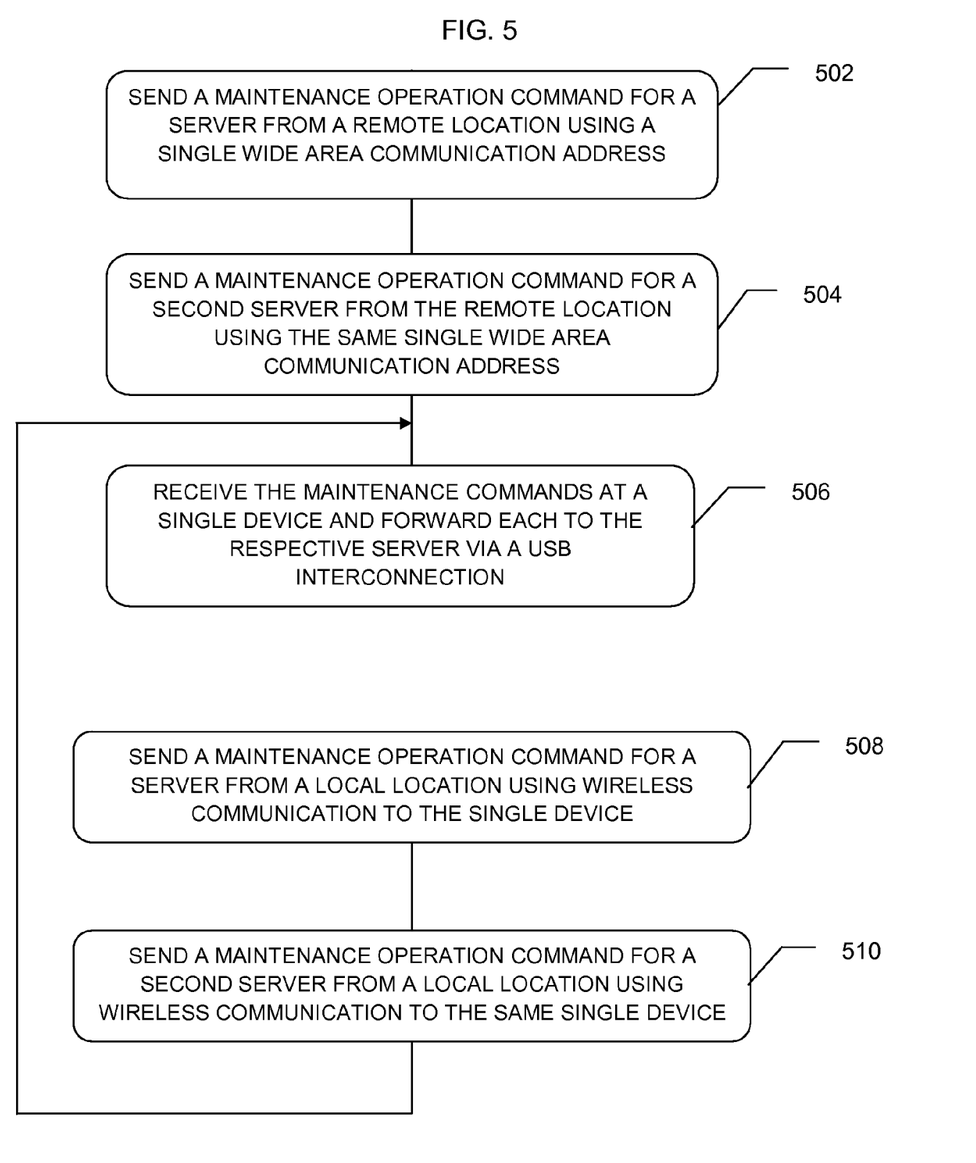
FIG. 5 is a flow chart illustrating communication of maintenance commands in an embodiment of the present invention.

FIG. 5 is a flow chart illustrating communication of maintenance commands in an embodiment of the present invention. A maintenance operation command is sent 502 from a management system for a particular server using the wide area communication address associated with the rack in which the server is installed. The command is received 506 by a single onboard administration device in the rack that interfaces to the wide area communication system using the single communication address. The onboard administration device then sends the maintenance command to the designated server via a USB interconnection using the USB address of the designated server. The wide area communication address is generally an IP address assigned to the onboard administration device, although other types of communication may utilize other types of addressing mechanisms. As is commonly done, IP addresses may be fixed or virtual, but regardless of the type of communication mechanism the basic address used will be referred to herein as the assigned communication address.

Maintenance commands are sent 504 for other servers within the rack system using the same assigned communication address. The onboard administration system receives and forwards 506 each command to the designated server using USB address for that server. Other devices such as power supplies, I/O devices and RFID tags may also be monitored and controlled from the remote management system using respective USB addresses within the rack system.

Similarly, a technician may walk up to the rack system and send 508 a maintenance command for a particular server within the rack system using a wireless USB device. Commands for other servers or devices within the rack system may also be sent 510 from the wireless USB user interface. The single device receives and forwards 506 the maintenance commands to the designated servers or other devices in the rack system using the USB address of the designated server or device.

Figure 6:
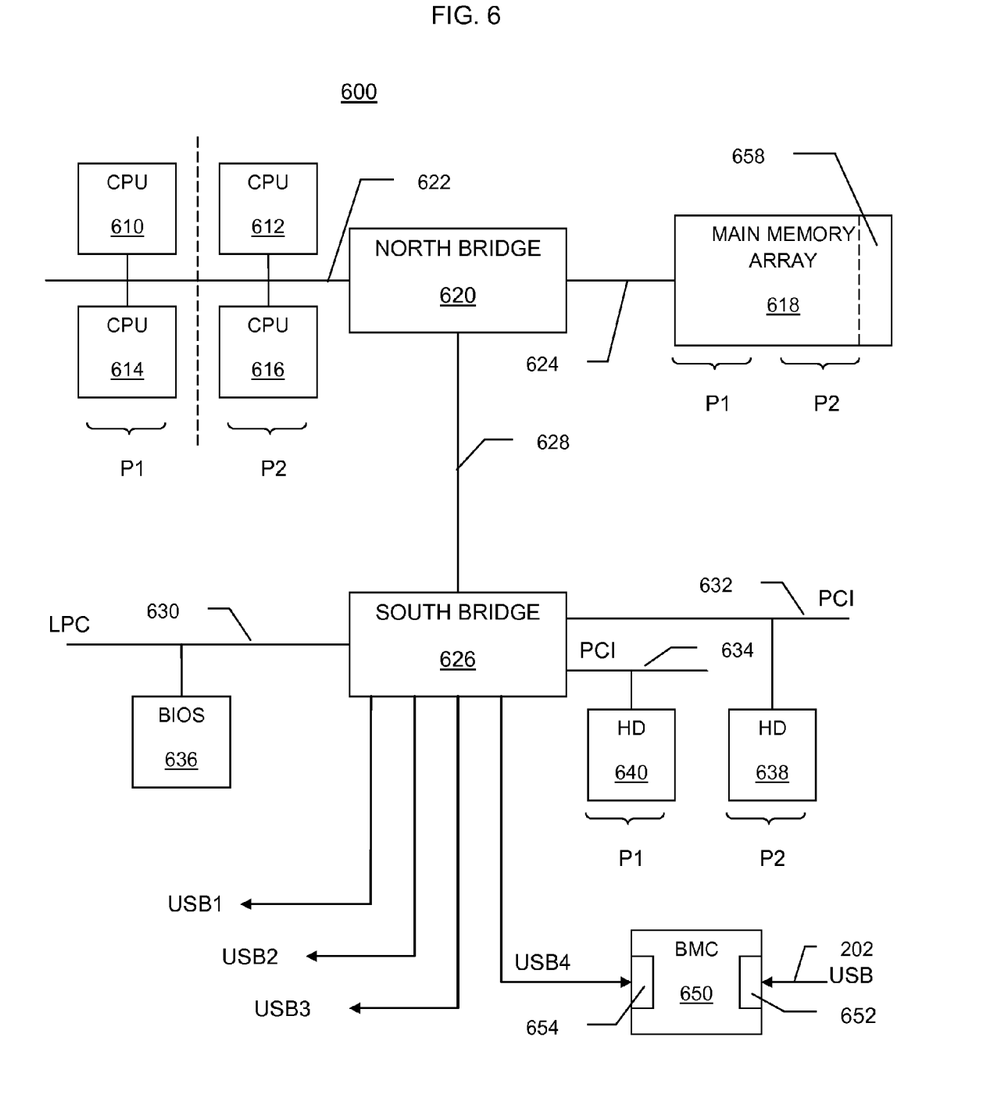
FIG. 6 is a block diagram of a server for the system of FIG. 1 illustrating an embodiment of a USB device port.

Referring FIG. 6 is a block diagram of an exemplary server for the system of FIG. 1 illustrating an embodiment of a USB device port. Server 600 comprises a plurality of processors 610, 612, 614, 616 coupled to a main memory array 618, and various other peripheral computer system components, through an integrated bridge device 620. In the exemplary computer system of FIG. 6, the bridge device 620 is labeled "North Bridge" because of its location on computer system drawings. Each of the CPU's couple to the North Bridge 620 by way of a host bus 622. The processors 610, 612, 614 and 616 may comprise Itanium™ processors made by Intel Corporation; however, the techniques of the present invention may be equivalently implemented in computer systems utilizing different types of processors. Because of the possibility of implementation with different processors, the server 600 may implement other bus configurations or bus bridges in addition to, or in place of, those illustrated in FIG. 6.

The main memory array 18 couples to the North Bridge 620 through a memory bus 624. The North Bridge 620 comprises a memory control unit (not specifically shown) that controls transactions to the main memory array 618 by asserting necessary control signals during memory accesses. The main memory array 618 functions as the working memory for each of the processors 610, 612, 614 and 616, and may comprise a conventional memory device or array of memory devices in which programs, instructions and data are stored. The main memory array 618 may comprise any suitable type of memory such as dynamic random access memory (DRAM), or any of the various types of DRAM devices such as synchronous DRAM (SDRAM), extended data output DRAM (EDO DRAM), or RAM bus™ DRAM (RDRAM).

Server 600 also comprises a second bridge logic device 626 that bridges a primary expansion bus 628 to various secondary expansion buses, such as a low pin count (LPC) bus 630, and one or more peripheral component interconnect (PCI) buses 632 and 634. Much like North Bridge device 620, the bridge device 626 is referred to as a "South Bridge" based primarily on its location in computer system drawings. The primary expansion bus 628 may comprise any suitable bus for coupling the North Bridge 620 and South Bridge 626. For example, in some embodiments the primary expansion bus 628 may be a PCI bus. In other embodiments, the primary expansion bus 628 may be a Hublink™ bus, which is a proprietary bus of Intel Corporation.

Still referring to FIG. 6, a basic input output system (BIOS) read-only memory (ROM) 636 is coupled to the South Bridge device by way of the LPC bus 630. The BIOS ROM 636 contain procedures and routines executable by one or more of the processors 610, 612, 614, or 616. In particular, the software procedure may comprise commands and instructions executed during and just after power-on self test (POST) procedures. The software routines may comprise commands to implement low-level hardware and system manipulation, which may be referred to as BIOS calls or BIOS routines.

Still referring to FIG. 6, server 600 may further comprise a plurality of PCI buses 632, 634. Although the exemplary computer system 600 has only two types of secondary expansion buses, the LPC bus 630 and the PCI buses 632, 634, server 600 may support many different types of communication buses. Each of the PCI buses 632, 634 illustrated in FIG. 6 may have coupled thereto a disk drive (HD) 638, 640 respectively. Thus, data stored on the disk drives 638, 640 may be accessed by the processors 610, 612, 614 and 616 through the various bridges and communication buses. While FIG. 6 illustrates only two disk drives, each coupled to different PCI buses, any number of disk drives may be used, including disk drives implemented in a redundant array of independent disks (RAID) system. Moreover, while each disk drive 638, 640 is shown coupled to its own PCI bus 632, 634 respectively, the disk drives may be coupled to the same PCI bus, or may be coupled to different types of buses.

Still referring to FIG. 6, south bridge 626 also contains four USB host ports USB1-USB4 which provide for the connection of various USB devices such as USB memory, USB disks, a keyboard and mouse or equivalent user interface device or devices, etc. BMC 650 is connected to one of the USB host ports USB4 via a BMC USB device interface 654 and contains a processor and memory with various stored programs that allow the BMC to emulate a user interface and a mass storage device so that the BMC can effectively control server 600 by providing user interface commands and system booting and/or application uploads from the emulated mass storage device within the BMC under control from a remote administrator. As described above, the enclosure onboard administration system of the rack in which server 600 is located connects to server 600 using the BMC USB device interface 652. BMC USB device interface 652 operates as a USB device port that is subservient to the host port of the enclosure OA system. BMC 650 receives commands from the enclosure OA system and interprets the commands and controls server 600 in response to the commands by emulating user input activity via the USB4 port. In this manner, server 600 is equipped with USB host ports USB1-USB4 that function as host ports for connecting to other devices, and server 600 is also equipped with USB device port 652 that functions as a USB device port for connecting to a USB host.

In another embodiment, a USB device port may be included directly within south bridge 626. In another embodiment, a BMC module and associated USB device port may be included within south bridge 626.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, in another embodiment, instead of using internet protocol for connecting the remote management system to the enclosure OA, other types of protocol may be used, such as frame relay, token net, or other types of wide area protocol that may be later developed. Various types of management systems may be used, such a HP Open View, available from Hewlett Packard Company.

In another embodiment, referring back to FIG. 3, some or all of USB interconnect 202a-202b may be replaced with wireless USB (WUSB). The fundamental relationship in WUSB is a hub and spoke topology. In this topology, the host initiates all the data traffic among the devices connected to it, allotting time slots and data bandwidth to each device connected. These relationships are referred to as clusters. The connections are point-to-point and directed between the WUSB host and WUSB device. The WUSB host can logically connect to a maximum of 127 WUSB devices, considered an informal WUSB cluster. WUSB clusters coexist within an overlapping spatial environment with minimum interference, thus allowing a number of other WUSB clusters to be present within the same radio cell. In this embodiment, onboard administrator 200 performs as a WUSB host. Each server and other device within the rack under control of OA 200 is a WUSB device. This is accomplished either by installing a wireless USB dongle on each BMC 204 or other device, or by incorporating the WUSB circuitry within BMC 204 and/or each other device.

In another embodiment, referring back to FIG. 3, a portion of the devices may be interconnected using USB wire and a portion of them are WUSB devices. In this embodiment, OA 200 includes a WUSB hub that provides both wireless and wired interconnection protocols.

In another embodiment, the servers in a given grouping may be enclosed in more than one rack enclosure, or may be enclosed in various configurations other than racks. For example, the servers may be arranged on shelves, placed in drawers, or otherwise deployed. In any case, each grouping is connected via a USB or WUSB interconnection to a group onboard administration system for control and management.

Many other configurations for providing server 600 with a USB device port will be apparent to one skilled in the art.

It is therefore contemplated that the appended claims will cover any such modifications of the embodiments as fall within the true scope and spirit of the invention.

What is claimed is:

1. A multi-server computing system, comprising:
 a plurality of server modules mounted to an enclosure, each server module comprising:
  a base management controller comprising:
   a universal serial bus (USB) interface; and
 an enclosure onboard administration (OA) module mounted to the enclosure having an addressable communication interface to communicate with a remote management system and a USB interface connected to each of the plurality of servers via the respective USB interface of the base management controllers of the server modules, wherein the enclosure OA module is to receive maintenance commands from the remote management system via the addressable communication interface using a communication address assigned to the enclosure OA module, at least some of the maintenance commands intended for different ones of the server modules, and the enclosure OA module is to communicate the maintenance commands to the different ones of the server modules via the USB interface.

2. The computing system of claim 1, wherein the enclosure OA module further comprises a wireless interface for wireless communication with a local management system.

3. The computing system of claim 1, wherein the USB interface comprises a wireless USB interface.

4. The computing system of claim 1, further comprising one or more power supplies each having a USB interface connected to the USB interface of the enclosure OA module, the enclosure OA module can monitor the status of each power supply via the USB interface.

5. The computing system of claim 1, further comprising one or more peripheral devices each having a USB interface connected to the USB interface of the enclosure OA module, the enclosure OA module can monitor the status of each peripheral device via the USB interface.

6. The computing system of claim 1, further comprising a second plurality of server modules mounted in one or more additional enclosures, each server module of the second plurality of server modules having a USB interface connected to the USB interface of the enclosure OA module.

7. The computing system of claim 1, wherein the USB interface of the enclosure OA module operates as a master and the USB interface of each of the plurality of server modules operates as a slave to the enclosure OA module.

8. A multi-server computing system, comprising:
a plurality of server modules mounted to an enclosure, each server module comprising:
a base management controller comprising:
a wireless universal serial bus (WUSB) interface; and
an enclosure onboard administration (OA) module mounted to the enclosure having an addressable communication interface to communicate with a remote management system and a WUSB interface operable to wirelessly connect to each of the plurality of servers via the respective WUSB interface of the base management controller of each server module, wherein the enclosure OA module is to receive maintenance commands from the remote management system via the addressable communication interface using a communication address assigned to the enclosure OA module, at least some of the maintenance commands intended for different ones of the server modules, and the enclosure OA module is to communicate the maintenance commands to different ones of the server modules via the WUSB interface.

9. The computing system of claim 8, further comprising one or more power supplies, each of the power supplies having a WUSB interface operable to connect to the WUSB interface of the enclosure OA module, wherein the enclosure OA module can monitor the status of each power supply via the WUSB interface of the enclosure OA module.

10. The computing system of claim 8, further comprising one or more peripheral devices, each of the peripheral devices having a WUSB interface operable to connect to the WUSB interface of the enclosure OA module, wherein the enclosure OA module can monitor the status of each peripheral device via the WUSB interface of the enclosure OA module.

11. The computing system of claim 8, further comprising a second plurality of server modules mounted to one or more additional enclosures, each server of the second plurality of server modules having a WUSB interface operable to connect to the WUSB interface of the enclosure OA module.

12. The computing system of claim 8, wherein the WUSB interface of the enclosure OA module operates as a master and the WUSB interface of each of the plurality of server modules operates as a slave to the enclosure OA module.

13. A server, comprising:
a universal serial bus (USB) host port in communication with the processor and operable as a host device to communicate with the peripheral USB slave devices, wherein the processor is to receive a plurality of device maintenance commands addressed to the processor, at least some of the device maintenance commands intended for different ones of the peripheral USB slave devices; and
a base management controller comprising:
a USB device port in communication with the USB host port to receive a respective one of the device maintenance commands intended for the peripheral USB slave device associated with the base management controller.

14. The server of claim 13, wherein the processor and memory are located in a server system enclosure, and wherein the processor is in communication with the base management controller and a plurality of other base management controllers in the server system enclosure via the USB host port.

15. A method for managing a plurality of server modules, comprising:
the administration device in communication with each of the server modules via a respective universal serial bus (USB) connection;
receiving, at the administration device from a remote location, a first maintenance command addressed to the first network communication address, the first maintenance command intended for a first one of the plurality of server modules;
receiving, at the administration device from the remote location, a second maintenance command addressed to the first network communication address, the second maintenance command intended for a second one of the plurality of server modules;
forwarding, by the administration device, the first maintenance command to the first one of the plurality of server modules via a first one of the USB connections and the second maintenance command to the second one of the plurality of server modules via a second one of the USB connections.

16. The method of claim 15, further comprising:
receiving a power supply maintenance command at the administration device using the first network communication address; and
forwarding the power supply maintenance command to a power supply via a USB connection between the administration device and the power supply.

17. The method of claim 15, further comprising:
receiving a peripheral device maintenance command at the administration device using the first network communication address; and
forwarding the peripheral device maintenance command to a peripheral device connected to one of the plurality of server modules via a respective one of the USB connections.

18. The method of claim 15, wherein at least some of the USB connections are wireless USB connections.

19. The method of claim 15, wherein the administration device is communicatively coupled to the plurality of server modules via only the USB connections.

* * * * *